(12) United States Patent
Feuerstraeter et al.

(10) Patent No.: US 6,285,659 B1
(45) Date of Patent: *Sep. 4, 2001

(54) AUTOMATIC PROTOCOL SELECTION MECHANISM

(75) Inventors: Mark T. Feuerstraeter, Rancho Cordova; Kirk Hayden, El Dorado Hills, both of CA (US)

(73) Assignee: Level One Communications, Inc., Sacramento, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/926,514

(22) Filed: Sep. 10, 1997

(51) Int. Cl.[7] ............................. H04L 12/26; G06F 15/16
(52) U.S. Cl. ..................... 370/244; 370/466; 709/230; 714/704
(58) Field of Search ............................ 370/389, 401, 370/465, 244, 466, 467, 468, 462, 396, 296, 445, 474, 252; 709/230, 232, 233; 714/704, 706

(56) References Cited

U.S. PATENT DOCUMENTS

| | | | | |
|---|---|---|---|---|
| 5,299,201 | * | 3/1994 | Carusone et al. | 714/704 |
| 5,321,813 | * | 6/1994 | McMillen et al. | 370/389 |
| 5,331,642 | | 7/1994 | Valley et al. | 714/705 |
| 5,432,775 | * | 7/1995 | Crayford | 370/296 |
| 5,469,436 | * | 11/1995 | Brandner et al. | 370/474 |
| 5,491,687 | | 2/1996 | Christensen et al. | 370/253 |
| 5,541,957 | | 7/1996 | Lau | 375/258 |
| 5,586,117 | * | 12/1996 | Eden et al. | 370/466 |
| 5,610,903 | * | 3/1997 | Crayford | 370/445 |
| 5,612,953 | * | 3/1997 | Olnowich | 370/389 |
| 6,072,803 | * | 6/2000 | Allmond et al. | 370/445 |

OTHER PUBLICATIONS

"Compaq Netelligent Repeaters—Bringing 100Mb/s To The Desktop." *Compaq Online*, ©Copyright 1996 Compaq Computer Corporation, http://www.compaq.com/newsroom/repetrs.html, Revised: Mar. 25, 1996, 1 page.

"Changes to existing 802.3 Clauses," Draft Changes to IEEE Std. 802.3, Mar. 5, 1996, pp. 1–39.

"28. Physical layer link signaling for 10 Mb/s & 100 Mb/s Auto–Negotiation on twisted–pair," Draft Supplement to IEEE Std. 802.3 With 100BASE–T2 Proposed Changes, Mar. 20, 1996, pp. 28–1 to 28–55.

"27. Repeater for 100 Mb/s baseband networks," Supplement to IEEE Std. 802.3, Jun. 12, 1995, pp. 189–219.

"32. Physical coding sublayer (PCS), physical medium attachment (PMA) sublayer and baseband medium, type 100BASE–T2," Draft Supplement to IEEE Std. 802.3, Mar. 5, 1996, pp. 1–88.

* cited by examiner

Primary Examiner—Alpus H. Hsu
Assistant Examiner—Afsar M. Qureshi
(74) Attorney, Agent, or Firm—Merchant & Gould P.C.

(57) ABSTRACT

A network device automatically detects the best protocol a network will support. The network device includes a driver for transmitting data, a receiver for receiving data, and a port operationally coupled to the driver and receiver. The network device further includes negotiation logic coupled to the driver and receiver for selecting a protocol in coordination with other network devices. The network device further includes error detection logic and backs down to a lower transmission rate if errors are detected after the initial negotiation of the selected protocol.

17 Claims, 4 Drawing Sheets

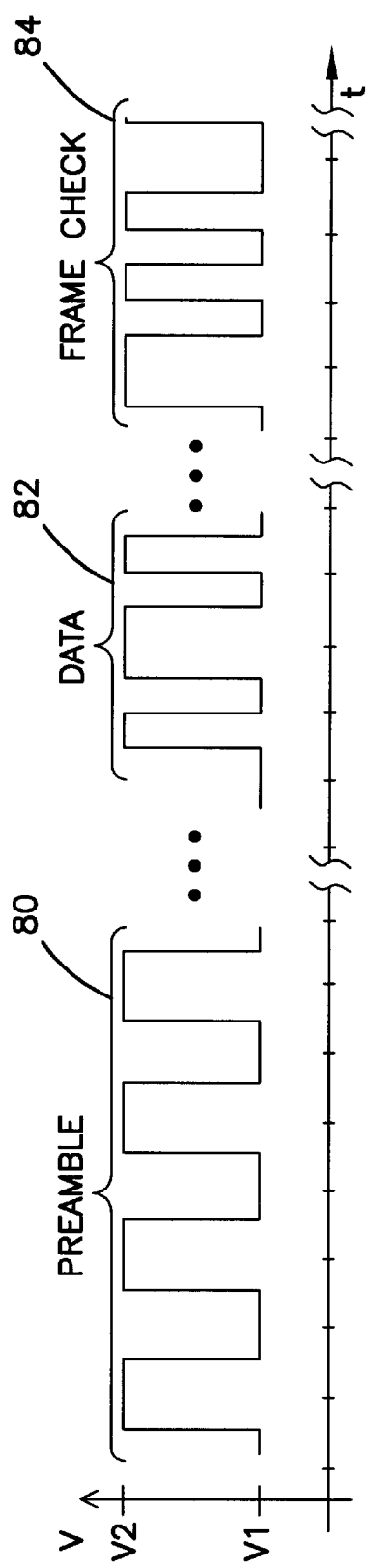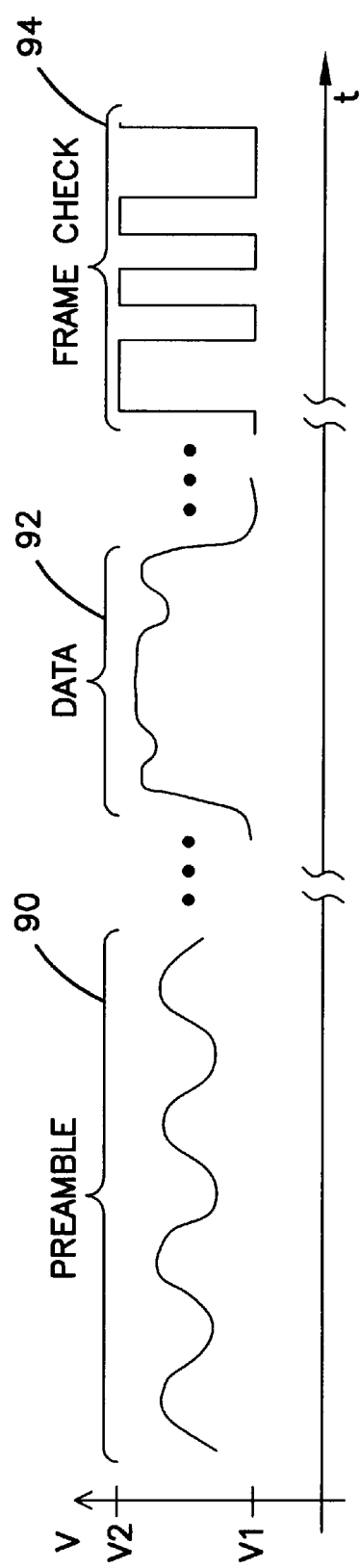

AUTOMATIC PROTOCOL SELECTION MECHANISM

BACKGROUND OF THE INVENTION

1. Field of the Invention

The invention relates generally to a method and mechanism for selecting a network protocol, and more particularly to a method and mechanism for detecting network limitations and selecting an appropriate protocol.

2. Description of the Related Art

Recent advancements in the art of data communications have provided great strides in resource sharing amongst computer systems through the use of networks which offer reliable high-speed data channels. Networks allow versatility by defining a common standard for communication so that information according to as standard protocol may be exchanged across user applications. As the popularity of networks increase so does the demand for performance. More sophisticated protocols are being established to meet this demand and are utilizing existing twisted pair wires in office buildings so that many users have access to shared resources at minimal expense.

As will be appreciated by those skilled in the art, communication networks and their operations can be described according to the Open Systems Interconnection (OSI) model which includes seven layers including an application, presentation, session, transport, network, link, and physical layer. The OSI model was developed by the International Organization for Standardization (ISO) and is described in "The Basics Book of OSI and Network Management" by Motorola Codex from Addison-Wesley Publishing Company, Inc., 1993 (First Printing September 1992), and which is incorporated by reference herein.

Each layer of the OSI model performs a specific data communications task, a service to and for the layer that precedes it (e.g., the network layer provides a service for the transport layer). The process can be likened to placing a letter in a series of envelopes before it is sent through the postal system. Each succeeding envelope adds another layer of processing or overhead information necessary to process the transaction. Together, all the envelopes help make sure the letter gets to the right address and that the message received is identical to the message sent. Once the entire package is received at its destination, the envelopes are opened one by one until the letter itself emerges exactly as written.

In a data communication transaction, however, each end user is unaware of the envelopes, which perform their functions transparently. For example, an automatic bank teller transaction can be tracked through the multi-layer OSI system. One multiple layer system (Open System A) provides an application layer that is an interface to a person attempting a transaction, while the other multiple layer system (Open System B) provides an application layer that interfaces with applications software in a bank's host computer. The corresponding layers in Open Systems A and B are called peer layers and communicate through peer protocols. These peer protocols provide communication support for a user's application, performing transaction related tasks such as debiting an account, dispensing currency, or crediting an account.

Actual data flow between the two open systems (Open System A and Open System B), however, is from top to bottom in one open system (Open System A, the source), across the communications line, and then from bottom to top in the other open system (Open System B, the destination). Each time that user application data passes downward from one layer to the next layer in the same system more processing information is added. When that information is removed and processed by the peer layer in the other system, it causes various tasks (error correction, flow control, etc.) to be performed.

The ISO has specifically defined all seven layers, which are summarized below in the order in which the data actually flows as they leave the source:

Layer 7, the application layer, provides for a user application (such as getting money from an automatic bank teller machine) to interface with the OSI application layer. That OSI application layer has a corresponding peer layer in the other open system, the bank's host computer.

Layer 6, the presentation layer, makes sure the user information (a request for $50 in cash to be debited from your checking account) is in a format (i.e., syntax or sequence of ones and zeros) the destination open system can understand.

Layer 5, the session layer, provides synchronization control of data between the open systems (i.e., makes sure the bit configurations that pass through layer 5 at the source are the same as those that pass through layer 5 at the destination).

Layer 4, the transport layer, ensures that an end-to-end connection has been established between the two open systems and is often reliable (i.e., layer 4 at the destination confirms the request for a connection, so to speak, that it has received from layer 4 at the source).

Layer 3, the network layer, provides routing and relaying of data through the network (among other things, at layer 3 on the outbound side an address gets placed on the envelope which is then read by layer 3 at the destination).

Layer 2, the data link layer, includes flow control of data as messages pass down through this layer in one open system and up through the peer layer in the other open system.

Layer 1, the physical interface layer, includes the ways in which data communications equipment is connected mechanically and electrically, and the means by which the data moves across those physical connections from layer 1 at the source to layer 1 at the destination.

The primary standard for Local and Metropolitan Area Network technologies is governed by IEEE Std. 802, which is incorporated by reference herein. IEEE Std. 802 describes the relationship among the family of 802 standards and their relationship to the ISO OSI Basic Reference Model. Generally, IEEE Std. 802 prescribes the functional, electrical and mechanical protocols, and the physical and data link layers for Local and Metropolitan Area Networks (LAN/MAN). The specification augments network principles, conforming to the ISO seven-layer model for OSI, commonly referred to as "Ethernet". In the hierarchy of the seven-layer model, the lowest layers, the so-called physical and data link layers, comprise functional modules that specify the physical transmission media and the way network nodes interface to it, the mechanics of transmitting information over the media in an error-free manner, and the format the information must take in order to be transmitted.

While there are several LAN technologies in use today, Ethernet is by far the most popular. The Ethernet standards include protocols for a 10 Mbps baseband transmissions typically referred to as 10Base-X. Computers equipped with a 10Base-X Ethernet interface attachments may link to other computers over an Ethernet LAN. These Ethernet LAN's provide fast and reliable data transmission networks. Nevertheless, the need for faster data transmission has led to the development of faster standards. One such standard includes the Fast Ethernet standards typically referred to as 100Base-X. The 100Base-X standards generally follow the 100Base-X standards except that the baseband data transmission rate increases from 10 Mbps to 100 Mbps. The 100Base-X standard, however, retains the original CSMA/CD medium access control mechanism.

The 100Base-X standards include the 100Base-T standard for interconnecting devices over an ordinary twisted pair telephone cable. The 100Base-T standard is popular for providing an inexpensive LAN in many modern offices.

The 100Base-X Fast Ethernet standards also include mechanisms for Auto-Negotiation of the media speed. As the 100 Mbps standard becomes more widely adopted, computers are being equipped with Ethernet interfaces that operate at both 10 Mbps and 100 Mbps. The Auto-Negotiation function is an optional part of the Ethernet standard that allows the devices to exchange information about their abilities. This, in turn, allows the devices to perform automatic configuration to select a common communication mode over the link. Generally, Auto-Negotiation provides automatic speed matching for multi-speed devices on a LAN. Multi-speed Ethernet interfaces can then take advantage of the highest speed offered on the LAN.

During the speed setup phase, Auto-Negotiation exchanges information about devices on the communication link. This information is exchanged via link pulses at 10 Mbps. Devices capable of communicating at 100 Mbps may advertise their ability by sending a packet of data at 10 Mbps typically referred to as fast link pulses. Where all devices on the communication link advertise this ability, the link will be established at 100 Mbps using a 100Base-X protocol.

After establishing an Ethernet connection, network devices typically transmit Manchester-encoded baseband serial data. The devices package the data into frames sometimes referred to as a packet. Each Ethernet packet typically includes a preamble (62 bits long), a start of frame delimiter (2 bits long), a destination address (6 bytes long), a source address (6 bytes long), a type field address (2 bytes long), a data field (46 to 1.5K bytes long), and a frame check sequence (4 bytes long).

These packets are physically sent over a network which interconnects devices. The IEEE 802.3.1.4. standard defines the physical characteristics for such cabling in a number of categories. Category 3, for example, as defined at 802.3. defines a twisted pair having transmission characteristics specified up to 16 MHz. Category 5 likewise defines a twisted pair having transmission characteristics specified up to 100 MHz. 100Base-T devices interconnected by a category 3 cable, will begin to set-up a communication link through Auto-Negotiation. The devices will advertise their 100 Mbps capabilities via fast link pulses at 10 Mbps. The Auto-negotiation may then establish a 100Base-T communication link at 100 Mbps. As mentioned above, the Category 3 cable only includes transmission characteristics up to 16 MHz. Consequently, the established 100Base-TX communication link may or may not function reliably. Specifically, where the interconnecting category 3 cable exceeds the IEEE Std. 802.3 requirements so that its transmissions characteristics extend to 100 MHz, the cable may support the 100Base-TX communication link. Where, however, the interconnecting category 3 cable's transmission characteristics do not extend to 100 MHz, the communication link will function sporadically or not at all.

By carefully determining the transmission characteristics of all network elements, a network administrator may avoid connecting 100 Mbps devices with lower frequency cable. This may involve rewiring an entire building to provide suitable cable for the 100 Mbps devices. Alternatively, the system administrator may manually force devices connected by a category 3 cable to communicate using 10Base-T at 10 Mbps. Typically, network devices include dip switches or other setting mechanism for selecting a protocol. Either of the above options effectively allow the system administrator to avoid the mismatched cable problem. Both, however, require that the system administrator carefully monitor the device characteristics of all network elements. This monitoring costs the system administrator significant amounts of time and requires expensive testing instruments, especially where the cable types cannot be readily determined.

For example in many office LANs, the interconnecting cables are hidden from view. Usually the cables do not bear an indication of their particular type. The cables may have been installed years ago to support a particular network. As devices on the network are upgraded, a system administrator may seek to increase the bit-rate of the network. The system administrator must then ensure that the installed cables are capable of supporting the increased bit-rate. To make this determination, the system administrator must apply a high-frequency signal to the network and measure the received signal at other points on the network. The system administrator might simply use two network devices sending and receiving test signals at different bit rates to determine the frequency response. Alternately, the system administrator might use a signal generator and an oscilloscope to measure the network's frequency response. In any case, the system administrator must spend a significant amount of time and use sophisticated tools to determine the maximum network bit rate.

In some cases, the system administrator may not be aware of the potential for the interconnecting conflict. Such a system administrator may unknowingly install 100Base-T devices on a category 3 cable network only to find that the upgraded network is completely nonfunctional. The system administrator may then spend a significant amount of time troubleshooting.

To avoid these problems, network devices should provide a method and mechanism to sense whether the interconnecting cable is capable of supporting the fastest common protocol rate. Where the cable is not, the network devices should back down to the fastest protocol which the cable will reliably support. The method and mechanism must be cheaply and easily implemented. Moreover, the network devices should provide a mechanism to notify the system administrator of the communication rate. Where the interconnecting cable limits the rate, the network devices should also notify the system administrator of this condition.

SUMMARY OF THE INVENTION

To overcome the problems associated with the prior art described above, and to overcome other limitations that will become apparent upon reading and understanding the present specification, the present invention discloses an automatic protocol selection mechanism.

The present invention solves the above-described problems by providing a driver for transmitting data, a receiver for receiving data, a port coupled to the driver and to the receiver for communicating on a network, negotiation logic coupled to the driver and receiver for selecting a first protocol, error detection logic coupled to the port for detecting an error count, and a protocol controller coupled to the negotiation logic and to the error detection logic wherein the error count triggers the protocol controller to cause a second protocol.

The present invention may further include repeater logic coupled to the receiver and to the transmitter wherein the repeater logic causes a driver to transmit a copy of the data received by the receiver.

One aspect of the present invention may include an indicator for displaying an active protocol and a cable rate limitation.

These and various other advantages and features of novelty which characterize the invention are pointed out with particularity in the claims annexed hereto and forming a part hereof. However, for better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout:

FIG. 2 is a graph of a portion of a packet of 100Base-T data received over a category 5 cable;

FIG. 3 is a graph of a portion of packet of 100Base-T data received over a category 3 cable;

DETAILED DESCRIPTION OF THE INVENTION

In the following description of the exemplary embodiments, reference is made to the accompanying drawings which form a part hereof, and in which is shown by way of illustration specific embodiments in which the invention may be practiced. Other embodiments may be utilized and structural changes may be made without departing from the scope of the present invention.

The present invention provides an automatic protocol selection mechanism for use on computer networks. The automatic protocol selection mechanism works to detect the fastest protocol which may be supported by a communication link on a computer network.

Figure 1:
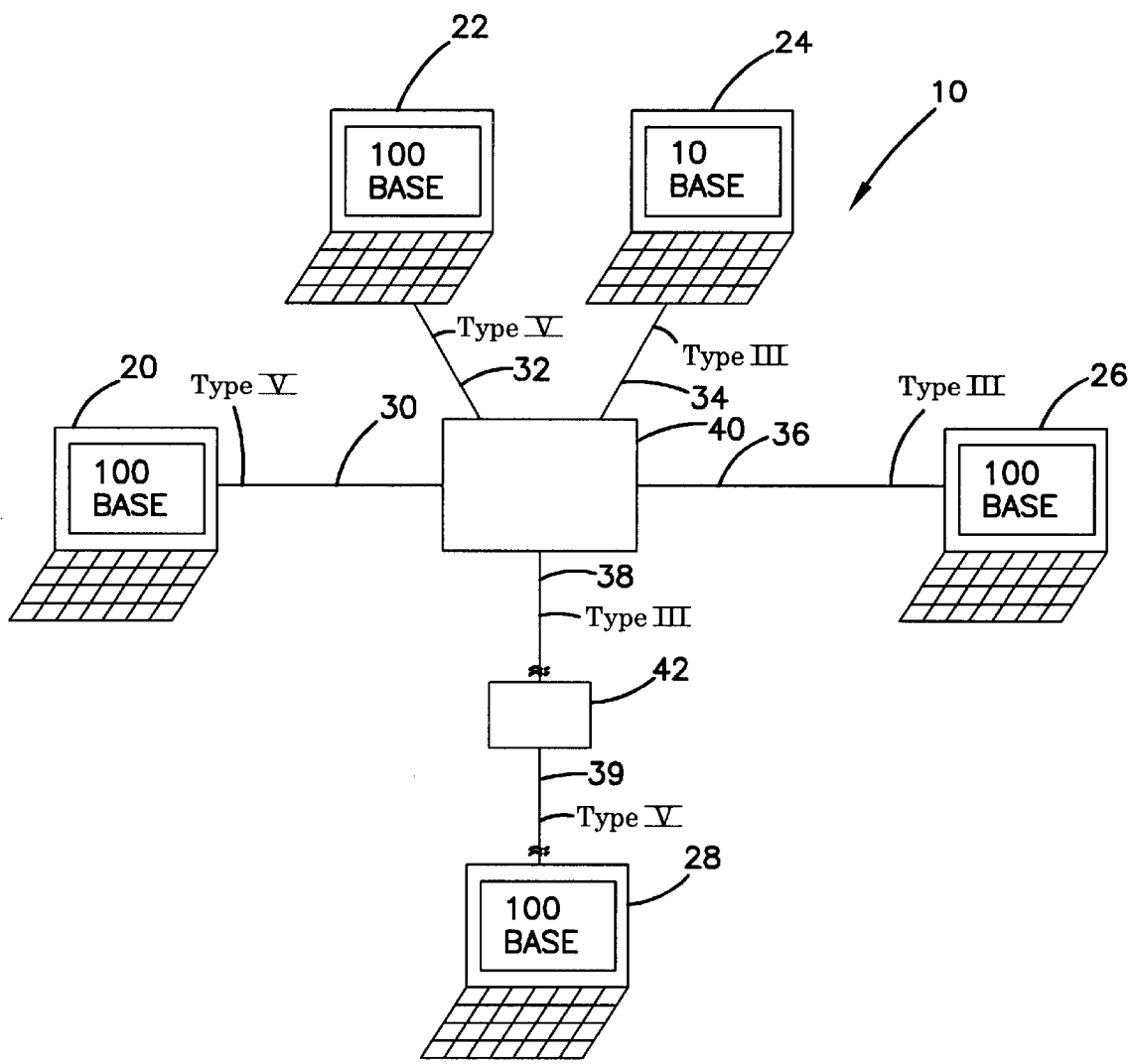
FIG. 1 is a system diagram of a computer network illustrating the use of an automatic protocol selection mechanism according to the present invention.

FIG. 1 illustrates a computer network 10 interconnecting a plurality of network devices. The network devices include a repeater hub 40 which acts as a central station to interconnect the other network devices. In addition, the computer network 10 includes a 10Base network computer 24 and 100Base network computers 20,22,26 and 28. These network computers connect to the repeater hub 40 via the category 3 type cable links 34,36 and 38, and the category 5 type cable links 30,32 and 39. In to establish a communication protocol. Here, the 10Base network computer 24 sends out link pulses at 10 Mbps indicating a 10Base capability. Consequently, the repeater hub 40 selects a 10Base protocol for communicating with the 10Base network computer 24. As will be appreciated by those skilled in the art, although this network link does not provide the speed associated with the 100Base link, it does provide relatively fast and reliable communication.

The 100Base network computer 26 connects to the repeater hub 40 over the category 3 type cable link 36. The communication protocol begins by both the repeater hub 40 and the 100Base network computer 26 advertising their 100Base capabilities using fastlink pulses. Again, these fastlink pulses are transmitted at 10 Mbps over the category 3 type cable link 36 which has transmission capabilities up to 16 Mbps. Consequently, the Auto-negotiation successfully selects a 100Base-T protocol.

The network devices then begin transmitting information using the 100Base-T protocol. However, because the category 3 type cable may not provide effective transmission for this protocol, the received data may become corrupted. Where the 100Base network computer 36 is addition, the computer network 10 includes a repeater 42 to connect the 100Base network computer 28 over a long distance to the central repeater hub 40.

The repeater hub 40 includes Auto-negotiation and 100Base communication capabilities. Consequently, the repeater hub will Auto-negotiate with the 100Base network computers 20,22,26 and 28 over the category 5 type cable links 30 and 32 to select the 100Base communication protocol.

As mentioned above, the IEEE 802.3 standard details the Auto-negotiation protocol to include fast link pulses which are sent by the network devices to indicate 100Base capabilities. These fastlink pulses are sent at a rate of 10 Mbps. After selecting the 100Base protocol using 10 Mbps pulses, the 100Base network computers communicate over the category 5 type cable links 30 and 32 at 100 Mbps. Where the physical configuration conforms to the IEEE 802.3 standard, those skilled in the art will appreciate that these network links provide for fast and reliable communication.

As with the 100Base network computers, the 10Base network computers also communicate with the repeater hub 40 constructed in accordance with the present invention, the network computer 26 automatically detects errors in the transmitted or received data packets. The network computer 26 monitors these detected errors. When the total number of errors or the error rate or other measure of erroneous transmission or reception exceeds a threshold level, the network computer disconnects the link. The network computer 26 and the repeater hub 40 then renegotiate the link protocol. As a result of the detected errors, the network computer does not advertise its 100Base capability so that the link will be established using 10Base or other more reliable protocol. Likewise, the repeater hub 40 may automatically detect errors in transmitted or received data packets, to renegotiate a more reliable protocol.

The 100Base network computer 28 connects to the repeater hub 40 via the category 5 type cable link 39, the repeater 42, and the type 3 cable link 38. The repeater 42 and the 100Base network computer 28 both include 100Base capabilities. Consequently, the repeater 42 and the 100Base network computer 28 may Auto-negotiate for a 100Base link protocol. Likewise, the repeater 42 and the repeater hub 40 may also Auto-negotiate for a 100Base link protocol. Where, however, the repeater hub 40 transmits or receives data to the 100Base network computer 28, using the 100Base communication protocol, the data may become corrupted by the type 3 cable link 38. The repeater hub 40 and the repeater 42 automatically detect the errors resulting from the computed data. The repeater 42 and the repeater hub 40 automatically disconnect the link to renegotiate a lower rate communication protocol which may be supported over the type 3 cable link 38.

As mentioned above, the IEEE 802.3 standard includes a specification for the physical layer of a communication link. More specifically, this defines the electrical signal for a packet of data which includes a preamble, a starter frame delimiter, a destination address, a source address, a typed field address, a data field, and a frame check sequence.

Generally, the preamble is a sequence of 56 bits having alternating 1 and 0 values that are used for synchronization. The start frame delimiter defines a sequence of 8 bits also alternating between 1 and 0 values but ending in a bit configuration of "1 1". The ending "1 1" bits indicate the end of the synchronization bits and the beginning of the medium access control data. The destination address indicates the address of the network device for which the following data is intended. The source address indicates the address of the transmitting device. The type field address indicates the length of the data which follows. The data field includes the physical signal for transmitting the data from the source to the destination. Finally, the frame check sequence is a cyclical redundancy check used for error detection. A transmitting network device performs a specific calculation on the data packet as described in IEEE 802.3. The source transmits the resulting 32 bit value as the last portion of a packet. The destination device then receives the packet and calculates the frame check sequence also in accordance with the IEEE 802.3 standard. Where the calculated value does not match the received value, the destination device assumes that a transmission error has occurred.

FIG. 2 shows portions of data packets. The figure includes a portion of the preamble signal 80 received from a 100Base device over a category 5 type cable link. As shown, the received preamble signal 80 generally retains a square wave shape. As will be appreciated by those skilled in the art, this preamble uses a Manchester encoded sequence of 1's and 0's to begin synchronization of the data transmission. The signal shown in FIG. 2 further includes a portion of the data signal 82. The data signal 82 may transmit many different combinations of 1's and 0's, unlike the preamble which transmits a sequence of alternating 1's and 0's. Finally, FIG. 2 includes a portion of the frame check signal 84. Again, this portion of the packet, provides an error checking mechanism to ensure that the signal transmitted over a communication link has not been corrupted. The receiving device then compares the actual received frame check sequence signal to the expected frame check sequence signal to verify that the packet was properly received and not corrupted in communication over the network link.

FIG. 3 shows portions of a packet transmitted over a corrupting communication link such as occurs by sending 100Base data over a category 3 type cable. The voltage level of the preamble signal 90 has been significantly reduced. In addition, the preamble signal 90 has been filtered to remove the sharp corners of the transmitted square wave signal. Likewise, the data signal 92 has been corrupted by the communication link so that the higher frequency portions of the data signal have been effectively filtered out. As shown by the data signal 92, the higher frequency portions of the transmitted data signal have been significantly rounded and their amplitude significantly reduced so that many of the 0's may be detected as 1's and vice versa. The frame check sequence signal 94, as shown, has not been corrupted in the same way as the preamble signal or the data signal 92. However, due to previous errors in the received packet, the frame check sequence may not properly correspond to the expected frame check sequence as calculated by the receiving device based on the received packet.

In accordance with the present invention, the receiving device may use these and other errors to determine that the interconnecting cable does not provide a reliable means for communicating at the selected protocol rate. As a result, the network device will cause a renegotiation of the protocol to a protocol which may be supported over the communication link.

Figure 4:
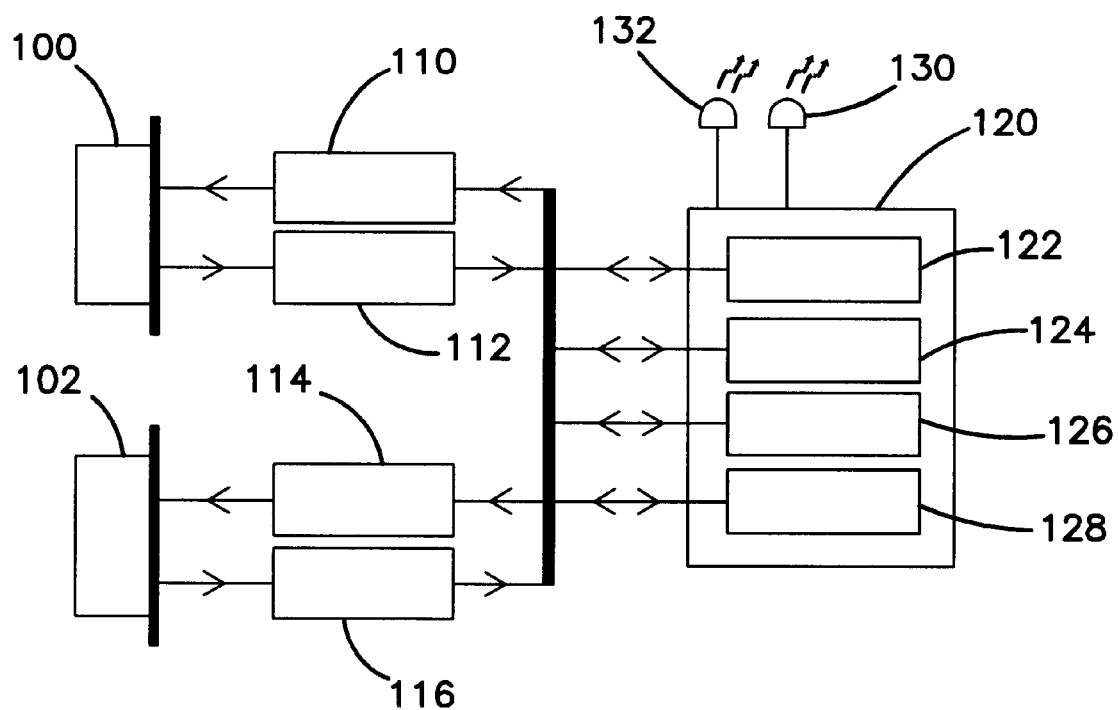
FIG. 4 is a block diagram of one fallback mechanism according to the present invention.

Turning now to FIG. 4, the block diagram of one automatic protocol mechanism used by the network devices of FIG. 1 is shown. The automatic protocol selection mechanism of FIG. 4, includes a port 100 for connecting to a network link. The port 100 in turn couples to the driver 110 and the receiver 112. The driver 110 is used by the protocol selection mechanism to transmit data through the port 100 onto the network link. Likewise, the receiver 112 accepts data through the network port 100 for the protocol selection mechanism. Both the driver 110 and the receiver 112 connect to the controller 120.

The controller 120 includes negotiation logic 122. The negotiation logic is used to select a protocol for transmitting data over a network link. The negotiation logic may include logic for Auto-negotiations so that the network device may select a 100Base protocol in accordance with the IEEE 802.3 standard. In addition, the controller 120 includes an error detection logic portion 124. The error detection logic portion 124 monitors transmitted and received data for errors. As mentioned above, the error detection may include error detection for substandard voltage amplituded, missing carrier signal, such as the clock, or erroneous frame check sequence, or other error indications. The error detection logic 124 further includes error logic which determines when the number of errors received or transmitted exceed a threshold which indicates that the communication link is probably the cause of the errors. Alternatively, the error detection logic may indicate that the rate of errors exceed a threshold level which again indicates an interconnecting cable limitation. In making this determination, the error detection logic uses an error count which may include any of the error count factors discussed above or other measures of erronious transmission.

The controller 120 further includes a protocol controller 126 operationally coupled to the error detection logic 124. The protocol controller upon receiving an indication that the error rate detection has exceeded a threshold, causes the renegotiation logic 122 to renegotiate a protocol. The negotiation logic 122 then begins renegotiation and excludes the first selected protocol. Consequently, the network device implementing the protocol logic shown in FIG. 4, will automatically select a second protocol which may be supported over the communication link.

The network device of FIG. 4 may further include logic inside of the controller 120 which includes repeater logic 128. The repeater logic is operationally coupled to a second port 102 through driver 114 and receiver 116. The additional port 102, driver 110, receiver 112 and repeater logic 128 allows the device to be used in this configuration as network repeater hub. As will be appreciated by those skilled in the art, the network device may further include a plurality of additional ports to interconnect to other devices. In addition, the controller 120 is operationally connected to protocol indicator 130 and cable indicator 132. The controller 120 causes the protocol indicator 130 to display an indication of the selected protocol. In addition, the controller 120 uses the cable indicator 132 to indicate that the error detection logic has caused a renegotiation of a network protocol as a result of an expected cable rate limitation.

Figure 5:
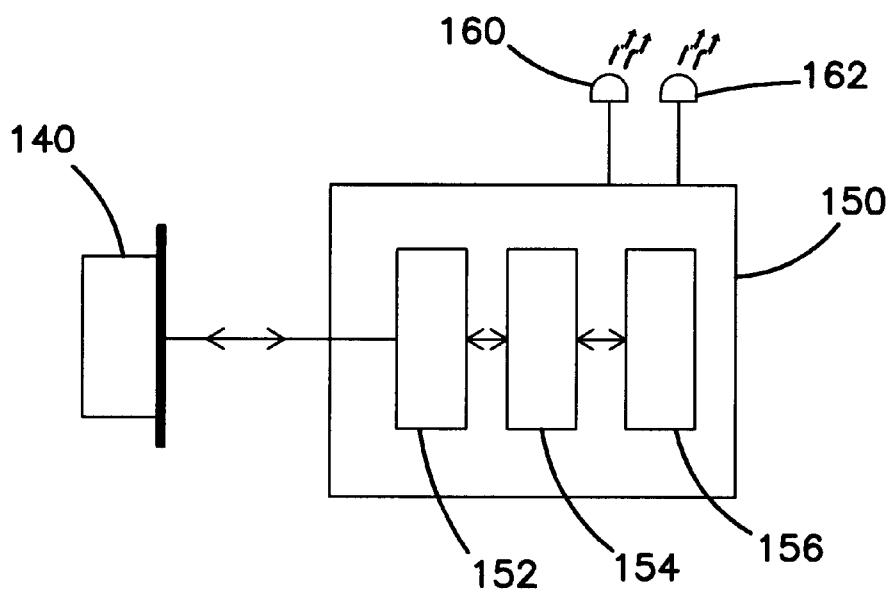
FIG. 5 is a block diagram of another fallback mechanism according to the present invention.

Turning now to FIG. 5 wherein another preferred embodiment of the invention is shown. The device of FIG. 5 includes a port 140 for connecting to a network. The port is operationally coupled to controller 150. The controller 150 generally controls the operational functions relating to network communication. For example, the controller 150 formats data for the transmit signal and receives incoming signals and may perform related actions.

More specifically, the controller 150 includes a negotiation controller 152, detection logic 154, and rate controller 156. The negotiation controller 152 provides the functionality described in IEEE 802.3 for negotiating a network link protocol with another network device. More specifically, the negotiation logic 152 may include Auto-negotiation logic for selecting a protocol with another network device. This negotiation logic selects the highest rate protocol which the network devices are capable of supporting. The detector logic 154 is operationally coupled to the negotiation controller 152. The detector logic 154 is also operationally coupled to the port 140. The detector logic 154 performs error detections as described above, in accordance with the IEEE 802.3 standard. These error detections may include carrier detect, check sum detect, character valid detect, and other error detections. The detector logic 154 then operationally couples to a rate controller 156. The rate controller 156 monitors the error detection status to determine when the error count has exceeded a threshold level to cause the negotiation controller 152 to renegotiate a network protocol.

In addition the controller 150 operationally couples to protocol indicator 160 and cable indicator 162. The protocol indicator 160 may indicate the selected network protocol. Likewise, the cable indicator may indicate that the error detection functionality has caused the controller 150 to renegotiate the protocol to a lower rate network protocol.

Figure 6:
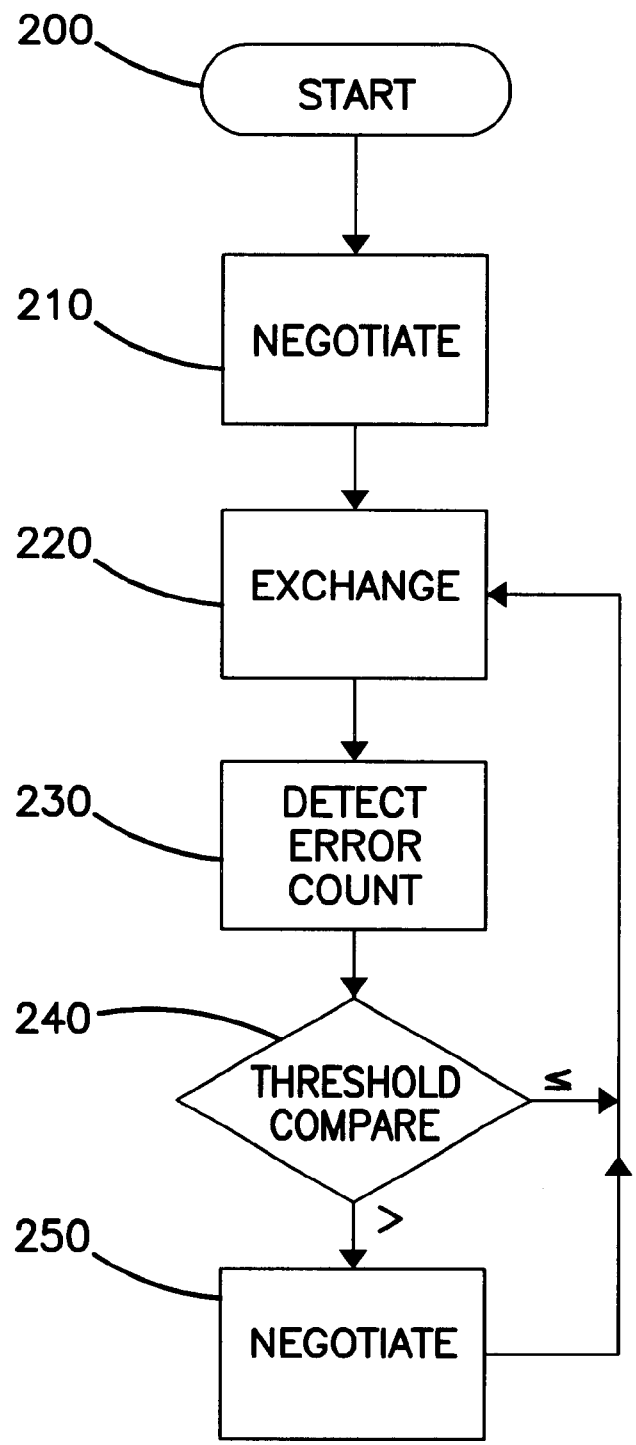
FIG. 6 is a flow chart illustrating a method for automatically selecting a protocol according to the present invention.

FIG. 6 illustrates one embodiment of a flowchart for the negotiation and error detection functionalities. The operation begins at start block 200. Here, a network device is powered up and first connected to a network. The network device then begins negotiating with other network devices at block 210. The devices select the best protocol having the highest transmission rate. After selecting a protocol, the device moves to block 220 where the network devices may interexchange data. While exchanging data, the device detects an error count at block 230. The error count may include a count of the number of errors detected or may include a number representing the error rate or other counts related to the errors resulting from the data transmissions. The error count is then used at a decision block 240 to compare the error count to the threshold. Where the error count is less than the threshold value the device returns to block 220 to exchange more data. Where however, the error count is greater than the threshold level the device proceeds to block 250 where it renegotiates a second protocol. At block 250, the device selects a new protocol which typically has a lower bit-rate and which may be supported over the network link. After renegotiating the protocol, the device then returns to exchange block 220 where it may again exchange data with other network devices.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A device for communicating on a network comprising:
    a driver for transmitting data;
    a receiver for receiving data;
    a port coupled to the driver and to the receiver for communicating on a network;
    negotiation logic coupled to the driver and receiver for selecting a first protocol on the network;
    error detection logic coupled to the port for detecting an error count wherein the error count is generated based upon data received by the port and upon the first protocol and wherein the data received by the port was transmitted under the first protocol;
    a protocol controller coupled to the negotiation logic and to the error detection logic wherein the error count triggers the protocol controller to instruct the negotiation logic to initiate data transmission under a second protocol on the network; and
    an indicator for displaying a cable rate limitation.

2. The device of claim 1 further comprising repeater logic coupled to the receiver and the transmitter wherein the repeater logic causes the driver to transmit a copy of the data received by the receiver.

3. The device of claim 2 wherein the port comprises a plurality of ports.

4. The device of claim 3 wherein said plurality of ports include at least a first and second port and wherein the negotiation logic separately selects a protocol for the first port and a protocol for the second port.

5. The device of claim 1 wherein the first protocol comprises a first bit rate and wherein the second protocol comprises a second bit rate.

6. The device of claim 5 wherein the first bit rate is higher than the second bit rate.

7. The device of claim 6 wherein the first bit rate is 100 Mbps and wherein the second bit rate is 10 Mbps.

8. The device of claim 1 further comprising an indicator for displaying an active protocol.

9. A protocol selector for selecting the protocol of a network device having a port connected to a network, wherein the protocol selector comprises:
    a negotiation controller coupled to a port for negotiating a first protocol;
    a detector coupled to the port for detecting an error count wherein the error count is based upon data received by the port and upon the first protocol and wherein data received by the port was transmitted under the first protocol;
    a rate controller coupled to the negotiation controller and the detector wherein the rate controller causes the negotiation controller to negotiate a second protocol when the error count exceeds a threshold level; and
    an indicator for a displaying a cable rate limitation.

10. The protocol selector of claim 9 wherein the first protocol defines packets having a check field and wherein the detector counts packets having an erroneous check field to determine the error count.

11. The protocol selector of claim 10 wherein the first protocol defines a first bit rate and the second protocol defines a second bit rate and wherein the first bit rate is greater than the second bit rate.

12. The protocol selector of claim 11 wherein the first protocol is 100Base-X and the second protocol is 10Base-X.

13. The protocol selector of claim 9 further comprising an indicator for displaying an active protocol.

14. A device for communicating on a network comprising:

a driver for transmitting data;

a receiver for receiving data;

a port coupled to the driver and to the receiver for communicating on a network;

negotiation logic coupled to the driver and receiver for selecting a first protocol on the network;

error detection logic coupled to the port for detecting an error count;

a protocol controller coupled to the negotiation logic and to the error detection logic wherein the error count triggers the protocol controller to cause a second protocol; and an indicator for displaying an active protocol.

15. The device of claim 14 further comprising an indicator for displaying a cable rate limitation.

16. A protocol selector for selecting the protocol of a network device having a port connected to a network, wherein the protocol selector comprises:

a negotiation controller coupled to a port for negotiating a first protocol;

a detector coupled to the port for detecting an error count;

a rate controller coupled to the negotiation controller and the detector wherein the rate controller causes the negotiation controller to negotiate a second protocol when the error count exceeds a threshold level; and an indicator for displaying an active protocol.

17. A protocol selector for selecting the protocol of a network device having a port connected to a network, wherein the protocol selector comprises:

a negotiation controller coupled to a port for negotiating a first protocol;

a detector coupled to the port for detecting an error count;

a rate controller coupled to the negotiation controller and the detector wherein the rate controller causes the negotiation controller to negotiate a second protocol when the error count exceeds a threshold level; and an indicator for displaying a cable rate limitation.

\* \* \* \* \*